Patented May 14, 1940

2,200,782

UNITED STATES PATENT OFFICE 2,200,782

DETINNING

Anton Vollmer, Berlin-Tegel, Germany, assignor to Metal & Thermit Corporation, Carteret, N. J., a corporation of New Jersey No Drawing. Application April 1, 1937, Serial No. 134,423. In Germany May 23, 1935

18 Claims. (Cl. 204—57)

This invention relates to detinning; and it comprises a method of recovering tin from tin scrap, tin-coated metals, tin plate waste and the like, wherein such a material is immersed in a stripping bath comprising an aqueous alkaline solution of a nitro-substituted compound of the benzene series which is stable toward alkali and toward anodic oxygen, and the dissolved tin is advantageously recovered from the resulting tin-containing solution by electrolytic methods; the nitro compound which is reduced during the stripping operation being usually regenerated by anodic oxidation; all as more fully hereinafter set forth and as claimed.

The present application is a continuation-in-part of my copending application, Serial Number 81,127, filed May 21, 1936.

Several different methods of recovering tin from tin scrap have been proposed. One method which has been employed to some extent involves the use of an alkaline stripping bath in which an oxidizing agent is dissolved. Several different oxidizing agents have been proposed for this purpose. In one of these processes, for example, the bath is prepared by dissolving nitrous gases in a caustic alkali solution, forming a mixture of nitrites and nitrates. Upon solution of the tin the nitrites and nitrates are partly reduced to ammonia which escapes from the bath and is usually lost. The tin is recovered by electrolysis of the solution, after which nitrous gases must be passed through the bath in order to replace the oxidizing agent.

I have found that any of the nitro substituted benzene compounds, which are soluble, as well as stable, in alkaline solution and which, advantageously, are stable toward anodic oxygen, can be employed as oxidizing agents in a tin stripping bath with the production of wholly unexpected results. It has been found that a rate of stripping can be obtained in these new stripping baths which may be from 400 to 500 times the rate obtained with prior art stripping baths. And it has been found possible to regenerate the nitro compounds after the stripping operation in a very simple and effective manner.

The nitro compounds which are particularly useful in the present invention can be represented by the following general formula: $NO_2—R—X$, wherein R represents a benzene, diphenyl, or naphthalene nucleus, which may be further substituted, while X represents a water-solubilizing group such as $—COOH$, $—OH$, $—ONa$, $—SO_3H$, $—CHO$, $—CONH_2$, etc. Other substituent groups which may be present in the molecule are alkyl, nitro, amino, halogen, alkoxy and additional water-solubilizing groups. Specific compounds found useful include ortho- and meta-nitrobenzoates, sodium ortho-nitrophenate, nitro-amino-zoates, sodium ortho-nitrophenate, nitro-amino-phenol (1, 2, 4), nitro-amino-phenolsulfonic acid (1, 2, 6, 4), ortho-nitrobenzaldehyde, ortho-nitro-benzamide, ortho-nitrobenzene sulfonic acid, nitro-naphthol, and nitro-chloro-benzene sulfonic acid (1, 6, 3). The nitro group in these compounds appears to be the active tin-stripping agent, the remainder of the molecule being of less importance.

I have found that many of the nitro compounds which form active tin-stripping agents can also be regenerated by anodic oxygen. These regeneratable compounds are those which, during solution of the tin, are reduced through the corresponding hydrazo compounds. I consequently prefer to use compounds of this nature.

The above nitro compounds are useful as tin-stripping agents over a wide range of concentrations. If desired the stripping operation can be conducted by the addition of a nitro compound at intervals, starting with a low concentration, or the bulk of the nitro compound which is required may be added at the start of the process. The concentration of the caustic alkali in the stripping bath is likewise subject to wide variation, although it is advantageous to keep the concentration of alkali low in order to prevent precipitation of stannates in the bath. The operative range of alkali is from about 2 to 20 per cent by weight.

The stripping baths of the present invention are operative over a wide range of temperatures. The stripping action is speeded up at elevated temperatures, however, so I usually heat the bath to temperatures ranging from about 60° to 80° C. Temperatures up to the boiling point of the bath can be employed.

Various methods can be employed for the regeneration of the nitro compound which is reduced during the stripping process. If a compound is employed which is reduced through the corresponding hydrazo compound, it is possible, as mentioned above, to oxidize the latter to the original nitro compound by anodic oxygen. The anodic oxygen which is generated during the electrolytic recovery of the tin may be employed for this purpose or another source may be used. I have found that the stripping process and the electrolytic recovery of the tin can be conducted in one and the same bath. The oxygen generated at the anode then automatically regenerates the nitro compound in situ and the result is a very simple and advantageous continuous process. Agitation of the bath with air or an oxygen-containing gas assists in the oxidation of the nitro compound. The air or oxygen may be bubbled around the anode which is usually of iron or other insoluble metal. Agitation of the bath also speeds up the stripping action.

A large anode surface is advantageous and I have found it convenient to use a metal tank or vessel to hold the stripping bath and to use this tank as the anode. This tank may be made of iron, for example, having a thickness of 3 to 5 mm. When the stripping bath is employed in this manner both as a stripping bath and as an electrolytic cell, a stable condition is reached wherein the nitro compound is regenerated as fast as it is reduced. The electrolyte thus has an almost unlimited life. The tin content of the bath can be built up until it approaches the saturation limit of about 4 per cent by weight of tin.

If tin plate is being detinned the iron beneath the tin is not attacked by the stripping bath. The stripped metal can be rinsed with water and the wash water returned to the bath to make up for evaporation losses, for example.

It is possible, of course, to conduct the regeneration of the nitro compound by other methods. The stripping bath may be passed continuously through the anode compartment of a diaphragm cell, for example, in order to oxidize the hydrazo compounds which are formed, and then returned to the bath. It is also possible to extract the reduction products from the stripping bath with a water-insoluble organic extracting agent, such as benzene, to oxidize these compounds and then to return the resulting nitro compounds to the bath. When a diaphragm cell is used in the process, the tin scrap or other material which is to be stripped can be placed in the anode compartment. The diaphragm prevents the oxidizing agent from reaching the cathode which tends to minimize current losses.

In order to illustrate the extreme rapidity with which tin can be stripped by means of baths within the present invention, it is only necessary to cite the following results which were obtained in a stripping bath containing 50 parts of meta-nitrobenzoic acid and 75 parts of caustic soda to 1000 parts of solution, the bath being maintained at a temperature of 70° C. This bath was found capable of stripping 10 grams of tin, in the absence of agitation, and 12 grams when stirred, within a period of 15 minutes, with a total exposed tin surface of 300 square centimeters and with a bath volume of 400 cc. A similar bath containing nitrites and nitrates, produced by passing nitrous gasses through the bath, in substantially equivalent concentrations, and with other conditions the same, was found to dissolve only from 0.5 to 0.8 gram of tin within a period of 7 hours.

The tin dissolves in my stripping baths in the form of the stannate. It appears probable that the nitro compound may be reduced during the stripping operation first to the azoxy compound, then to the azo compound and finally to the hydrazo compound. It is possible that the azoxy compound and/or the azo compound may dissolve the tin in the stannous form. Whatever may be the exact course of the reduction, it is evident that the reduction products which are formed in my process may be readily re-oxidized to active tin stripping agents. The oxygen of the air appears to contribute to this oxidation.

The tin which is deposited by electrolyzing the bath is glossy and homogeneous. The deposit is free from the dendritic type of deposit generally obtained from solutions containing stannous tin. Coatings having a thickness of even 15 mm. are found to be crystalline and homogeneous.

The material to be detinned may be placed in one of the usual rotary plating drums, which is rotated slowly during the stripping operation. This enables all tin-coated surfaces to be exposed to the stripping bath, while the rotation of the drum and the tumbling of the work contribute to the agitation of the bath.

It has been found advantageous to employ bipolar electrodes, in the combined stripping and electrolytic bath of the present invention. This assists in the oxidation of the reduction products in the bath and produces a better yield. A somewhat similar effect appears to be produced if the cathode is surrounded by means of a wire screen. A screen of iron provided with openings of 1 mm. has been found satisfactory. It is also possible to separate the cathode from the anode by means of a porous plate, with beneficial results. The tin deposit formed on the cathode can be melted off whenever it has built up to a sufficient thickness.

In one specific operation, which represents a practical embodiment of the present invention, I made up of an aqueous stripping bath containing 50 parts of metanitrobenzoic acid and 75 parts of caustic soda to 1500 parts of solution. This bath was placed in an iron tank and heated to a temperature of 75° C. Scrap tin was then suspended in the bath and agitation was provided. The tin was rapidly stripped from the scrap and, as soon as the tin content was built up appreciably, a brass cathode was inserted in the bath, this cathode being surrounded on all sides by means of a wire screen having 1 mm. openings. The iron tank itself was connected as anode in an electric circuit and a current was passed through the bath at a voltage of about 2.5 volts, the current density being maintained below 3 amperes per square decimeter of cathode surface. As soon as the tin scrap was sufficiently detinned, additional scrap was added to the bath, the detinned scrap being removed, washed and the washings returned to the bath to make up for evaporation losses. This procedure was continued for 6½ days. An over-all current efficiency of slightly over 90 per cent was obtained in the electrolytic deposition. In other operations runs as long as 70 days have been made with substantially the same results.

While I have described what I consider to be the best embodiments, various modifications can be made in the procedures described without departing from the purview of my invention. Any of the caustic alkalis can be employed in making up the stripping bath but I prefer to employ caustic soda owing to its low cost. For optimum results its concentration is maintained above about 4 per cent and not substantially exceeding about 9 per cent by weight.

One advantageous method of conducting the present invention is to employ a combined stripping and electrolytic bath but to provide separate compartments for these operations. These compartments can be separated by means of a porous diaphragm, or the surface of the bath can be separated by a metal partition. In the latter case the surface of the electrolyte in the compartment in which the electrolysis is conducted can be covered with a thin layer of paraffin to prevent loss of heat and evaporation. The tin scrap may be continuously introduced and withdrawn from the stripping compartment by the use of an endless belt or other conventional means.

It is possible, of course, to recover metallic tin from my stripping bath by conventional methods other than those involving electrolytic deposition. It is equally possible to oxidize the reduction products derived from the nitro compounds by methods other than those specifically described.

The tin can be deposited from my stripping bath with a current efficiency ranging from about 90 to 99 per cent provided that the bath is kept substantially saturated with tin. Voltages of from 2.5 to 3 volts have been found satisfactory with current densities ranging up to 300 amperes per square meter of cathode surface (0.19 amps./sq. in.).

Other modifications of my process will be immediately evident to those skilled in the art. Such modifications as fall within the scope of the following claims I consider to be part of my present invention.

What I claim is:

1. In the process of detinning tin scrap, tin coated metals, tin plate waste and the like, the step which comprises immersing such a material in an aqueous bath containing a caustic alkali and a nitro-substituted organic compounds of the benzene series dissolved therein under conditions producing stripping of the tin, said organic compound being stable towards said alkali.

2. In the process of detinning tin scrap, tin coated metals, tin plate waste and the like, the steps which comprise immersing such a material in an aqueous caustic solution containing dissolved therein a nitro-substituted organic compound of the benzene series under conditions producing solution of tin and simultaneous reduction of the nitro compound, and oxidizing the reduction products of said nitro compound; said nitro-substituted organic compound being one represented by the general formula $NO_2$—R—X, wherein R represents a benzene, diphenyl or naphthalene nucleus which may be further substituted while X represents one of the groups —COOH, —OH, —ONa, —$SO_3H$, —$CONH_2$.

3. The process of claim 2 wherein said nitro compound is one capable of being reduced to the corresponding hydrazo compound during solution of said tin.

4. The process of claim 2 wherein the reduction products of said nitro compound are oxidized by anodic oxygen.

5. In the detinning of tin scrap, tin coated metals, tin plate waste and the like, the process which comprises establishing and maintaining a stripping bath containing an aqueous caustic alkali solution of a nitro-substituted organic compound of the benzene series, which compound is stable in said alkali solution and toward anodic oxygen, stripping tin in said bath and electrolytically depositing the dissolved tin on a cathode dipped into said bath.

6. In the detinning of tin scrap, tin coated metals, tin plate waste and the like, the process which comprises dissolving tin from such a material in a bath containing an aqueous solution of caustic alkali and a nitro-substituted organic compound of the benzene series, which is stable toward anodic oxygen and said alkali, and subjecting the resulting bath to the action of anodic oxygen, thereby oxidizing the reduction products of said nitro compound.

7. In the process of recovering tin from tin scrap, tin coated metals, tin plate waste and the like, the step which comprises immersing such a material in an aqueous solution of a caustic alkali containing dissolved therein an organic compound represented by the general formula $NO_2$—R—X, wherein R represents a benzene, diphenyl, or naphthalene nucleus and X represents a substituent group selected from a class consisting of —COOH, —OH, —ONa, —$SO_3H$, —CHO and —$CONH_2$.

8. The process of claim 7 wherein the organic compound is an alkali metal meta-nitrobenzoate.

9. The process of claim 7 wherein the organic compound is an alkali metal ortho-nitrobenzoate.

10. The process of claim 7 wherein the organic compound is an alkali metal ortho-nitrophenate.

11. The process which comprises continuously stripping tin in an aqueous bath of caustic alkali containing dissolved therein a nitro-substituted organic compound of the benzene series, which compound is stable toward caustic alkali and anodic oxygen, and continuously depositing the dissolved tin electrolytically in the same bath during the stripping operation.

12. The process of claim 11 wherein the stripping bath is contained in a metal tank which is connected as anode in an electrical circuit.

13. The process of claim 11 wherein the bath is maintained at a temperature ranging from about 60° C. up to the boiling point of the bath.

14. The process of claim 11 wherein the electrolysis is conducted with bipolar electrodes.

15. The process of claim 11 wherein the cathode is surrounded by a metallic screen.

16. The process of claim 11 wherein the electrolysis is conducted at a voltage of from about 2.5 to 3 volts and with a current density at the cathode not exceeding about 300 amperes per square meter.

17. The process which comprises stripping tin from scrap tin, tin coated metals, tin plate waste and the like by immersing such a material in an aqueous stripping bath containing sodium meta-nitrobenzoate and caustic soda of a concentration ranging from about 4 to 9 per cent by weight, continuing the stripping action until the bath becomes substantially saturated with tin and electrolytically depositing the dissolved tin in the same bath.

18. In the recovery of tin from scrap tin, tin coated metals, tin plate waste and other tin-bearing materials, the process which comprises establishing and maintaining a bath having a stripping compartment and an electrolyzing compartment; said bath containing an aqueous solution of caustic soda and a dissolved nitro-substituted organic compound of the benzene series, stable in alkaline solution and toward anodic oxygen, and being maintained at a temperature ranging from about 60° C. up to the boiling point of the bath; continuously passing tin-bearing materials through the stripping compartment of said bath and continuously depositing tin electrolytically in the electrolytic compartment of said bath.

ANTON VOLLMER.